United States Patent [19]

Fielder et al.

[11] 4,034,708

[45] July 12, 1977

[54] MODULAR DEVICE FOR PRODUCTION OF CAST PLASTIC EMBLEMS

[75] Inventors: William A. Fielder, Mount Sterling; Harold E. Wilson, Thornville; Robert E. Waugh, Columbus, all of Ohio

[73] Assignee: The D. L. Auld Co., Columbus, Ohio

[21] Appl. No.: 718,578

[22] Filed: Aug. 30, 1976

[51] Int. Cl.² .......................................... B05B 5/02
[52] U.S. Cl. ................................. 118/642; 165/61; 118/50
[58] Field of Search ............ 118/641, 642, 643, 50, 118/59; 34/92, 60, 61; 165/30, 61

[56] References Cited

U.S. PATENT DOCUMENTS

| | | | |
|---|---|---|---|
| 2,770,550 | 11/1956 | Grangaard et al. | 118/641 X |
| 2,928,149 | 3/1960 | Zifferer | 34/92 X |
| 3,381,947 | 5/1968 | Beggs | 118/50 X |

Primary Examiner—Ronald Feldbaum
Attorney, Agent, or Firm—Biebel, French & Nauman

[57] ABSTRACT

A machine for holding a release sheet on which emblem substrates are mounted while plastic is cast on the substrates and for holding the release sheet and substrates and curing the plastic includes a radiation source which is movable into a position above the release sheet. The platen holding the release sheet has a first cavity which is partially evacuated and which communicates with the upper surface of the platen through a plurality of openings. A second cavity in the platen receives temperature stabilizing fluid. Control circuitry is provided permitting alteration of the operation sequence of the machine.

12 Claims, 10 Drawing Figures

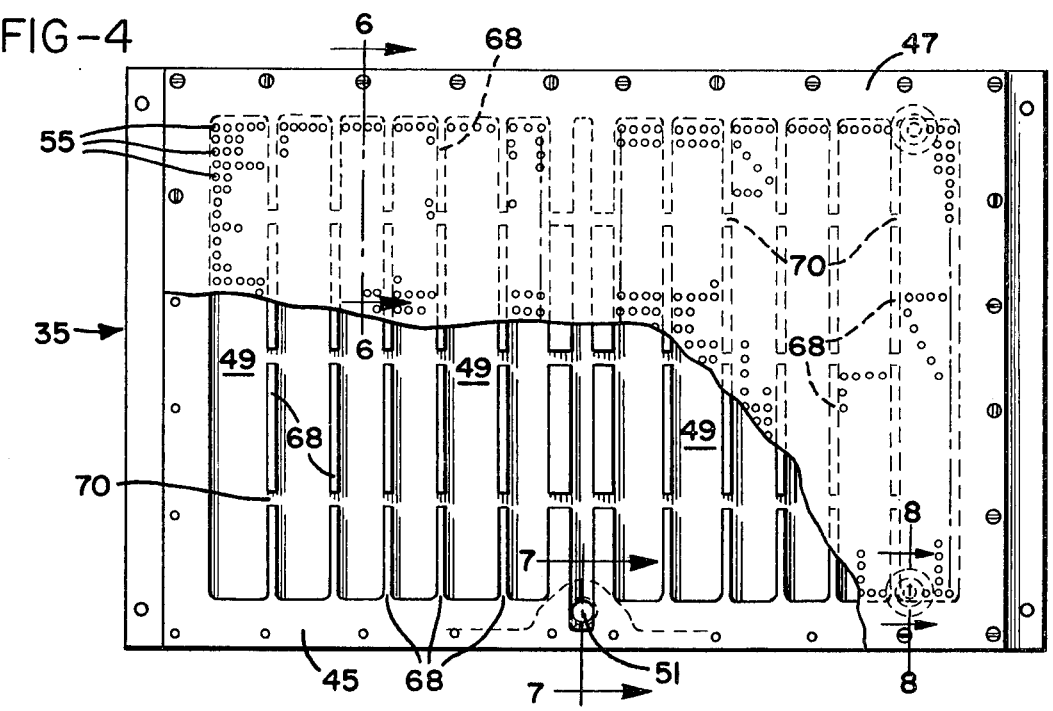
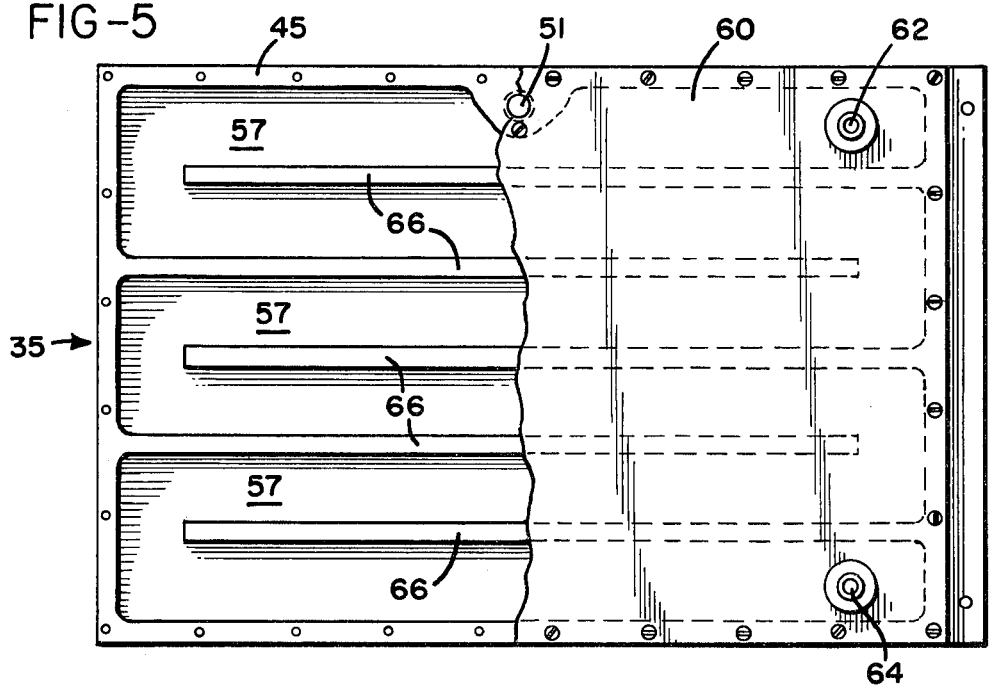
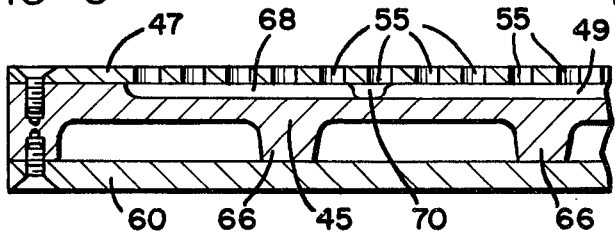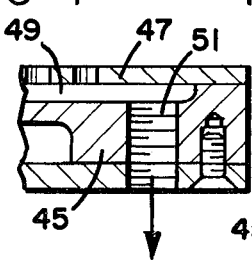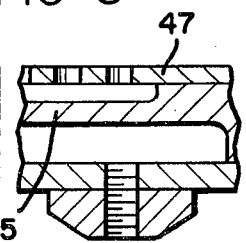

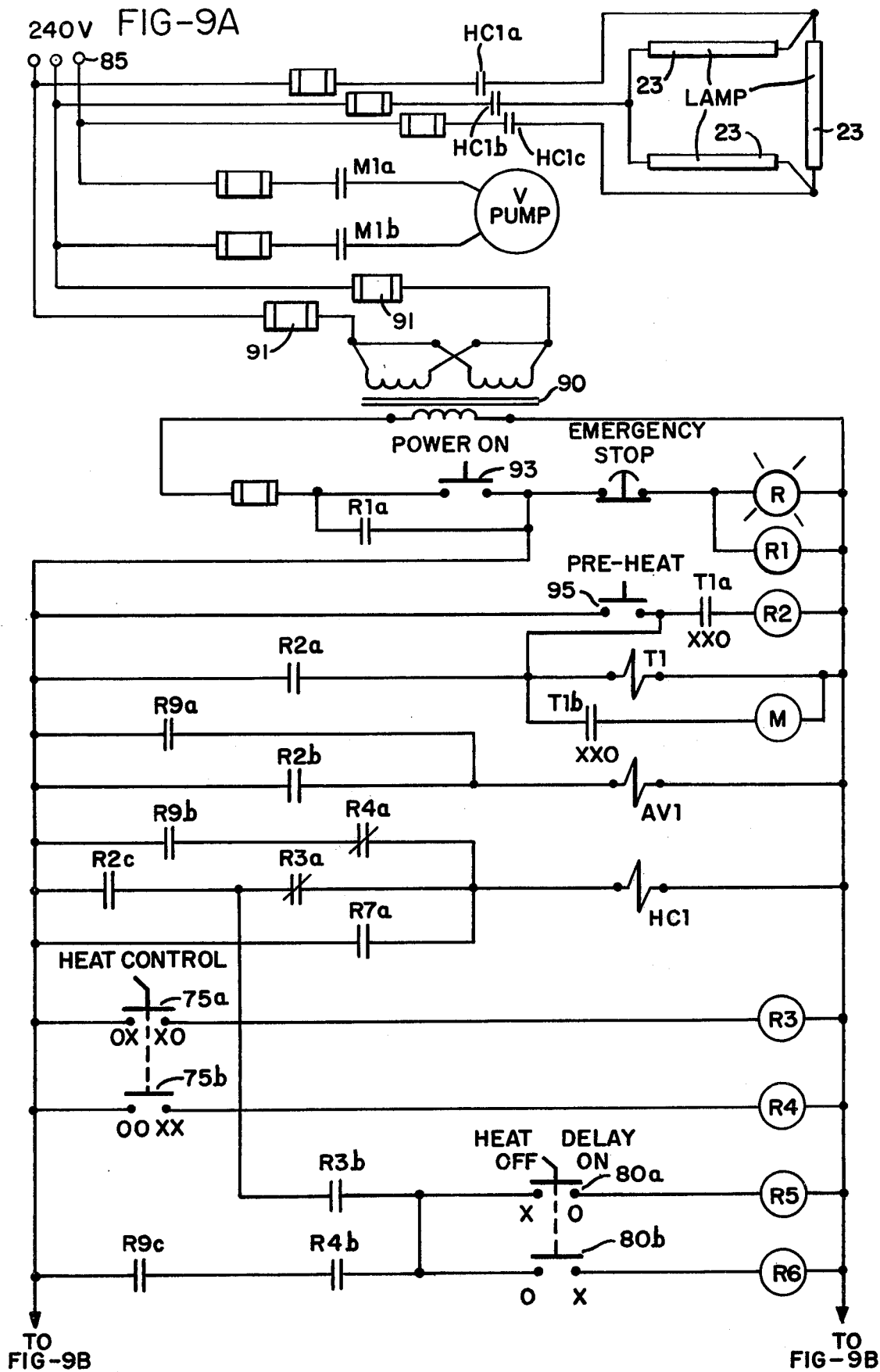

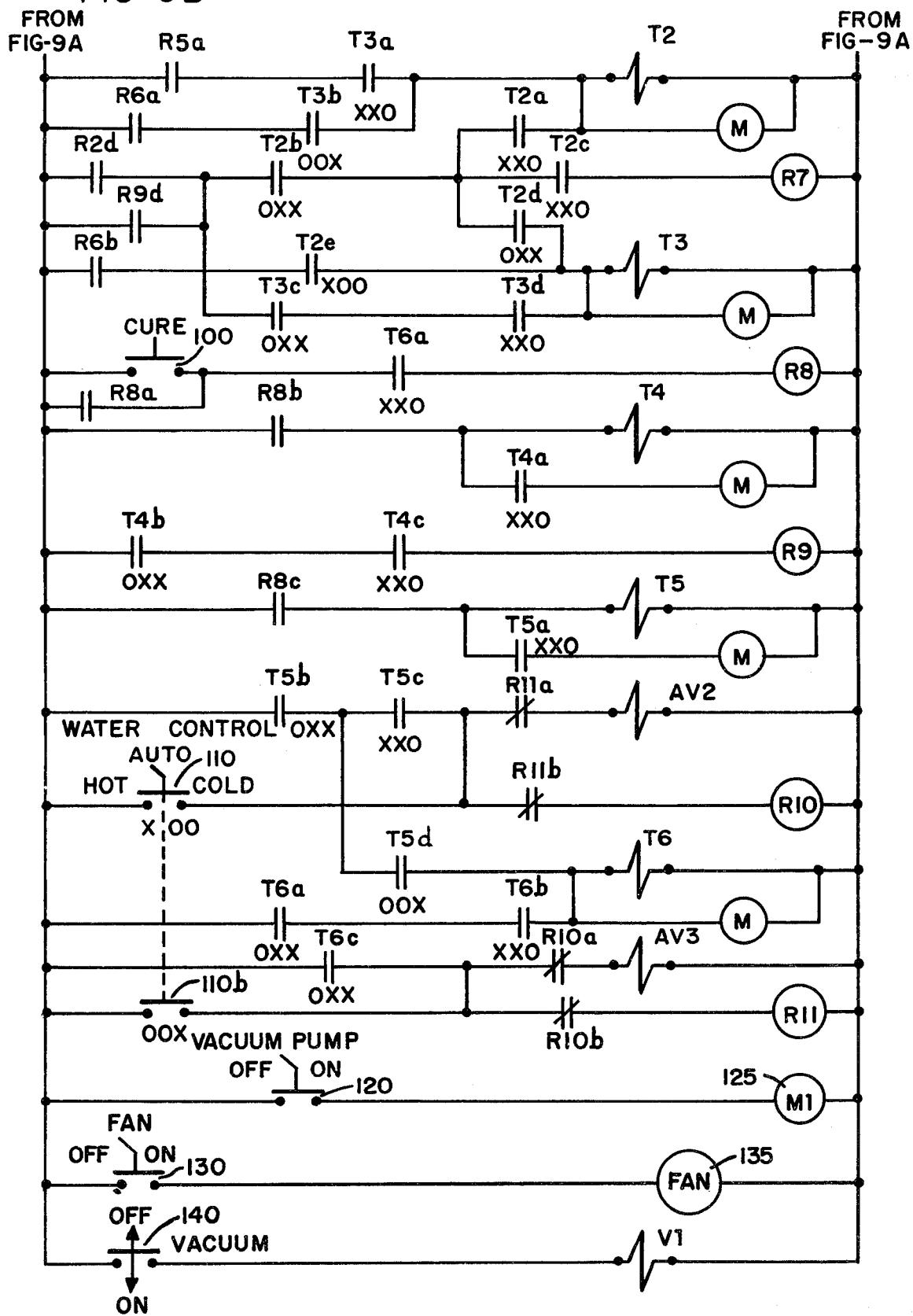

MODULAR DEVICE FOR PRODUCTION OF CAST PLASTIC EMBLEMS

BACKGROUND OF THE INVENTION

The present invention relates to casting machinery, and more particularly to a device useful in casting and curing plastic in the manufacture of decorative emblems.

Decorative emblems may be produced in which a foil substrate of metalized Mylar polyester film, vinyl or paper, or thin aluminum is coated with a clear plastic material. A sheet of substrate material may be prepared by screening a plurality of decorative emblems on one side of the sheet, embossing, and applying a layer of adhesive on its opposite side. A release paper is placed over the adhesive-coated side of the substrate material. A kiss cut die operation may then be used to cut through the substrate around each of the printed emblem designs without cutting the release paper. The excess substrate material between the emblems is then peeled from the release paper and discarded. Alternative methods of substrate preparation may be used. The general objective is the same, however — to produce a sheet of release paper upon which a plurality of printed emblems are adhesively mounted.

The sheet of release paper, upon which are positioned a number of printed emblem substrates which have been embossed, is then ready for a casting operation in which a precise amount of plastic material is deposited on the upper surface of each emblem substrate. As the plastic material is placed upon each substrate, it will spread uniformly over the surface of the substrate. Because of the surface tension of the plastic, however, it will not flow off of the substrate, but will create a lense effect in that it will be slightly thicker at the center than at the edges. The plastic is then cured, resulting in an attractive decorative emblem.

It is important during the casting process that each of the foil substrates be held substantially flat. If this is not done, a portion of the fluid plastic will flow off of the substrate and the emblem will thus be ruined. Additionally the substrate must be held flat during the curing process. Since curing of the plastic will typically involve irradiation with a source of ultraviolet or infrared radiation, as well as the application of heat, dimensional changes in the sheet of release paper or the substrate, or both, may tend to warp the substrate slightly. Even if this occurs after the plastic is cured sufficiently such that it will not flow off of the surface of the substrate, the resulting emblem will be distorted in shape and, therefore, probably not acceptable.

Depending on the type of substrate used and the size of the emblem desired, it may be necessary or desirable to heat the substrates prior to casting so that the viscosity of the plastic material cast on the substrates will be reduced, thus permitting flow over larger areas. Additionally, it is desirable to be able to control the temperature of the substrates while the emblems are being irradiated with infrared or ultraviolet radiation and the plastic is undergoing a curing reaction. The sheet of release paper and emblem substrates must be held substantially flat during the entire casting and curing process. Thus it is desirable that the casting and curing apparatus be movable into operative positions rather than moving the sheet of release paper and emblems.

Ventilation must be provided during the casting and curing process. Additionally, it may be desirable, under certain circumstances, to be able to apply radiation to the plastic material only periodically during the curing process.

Thus a need exists for a device which will hold a substrate in position during casting and curing and which will control the application of radiation and the temperature of the substrates during the entire process. Such a device should be well ventilated and should permit the sequence of machine steps to be altered, depending on the type of casting operation.

SUMMARY OF THE INVENTION

A machine for holding a release sheet on which is mounted a plurality of emblem substrates while plastic is cast on the pieces of substrate material and for thereafter curing the plastic includes a platen means for holding the release sheet while plastic is cast and cured. The platen means defines a first cavity and second cavity and a plurality of openings communicating between the first cavity and the flat upper surface of the platen. Means are provided for maintaining a partial vacuum in the first cavity and means are provided for supplying liquid to the second cavity. A radiation source means is movable into a position above the upper surface of the platen means.

More than one temperature of liquid may be supplied to the second cavity of the platen means. Means may also be provided for moving the radiation source means into a position above the upper surface of the platen means prior to casting the plastic material and to heat the pieces of substrate material before casting. The radiation source means may be operated periodically during the curing process. The radiation source means may be a source of infrared radiation or ultraviolet radiation depending on the type of plastic curing process used. An exhaust means is provided for drawing air across the platen and past the radiation source means and thereafter exhausting the air via an exhaust duct.

Accordingly, it is an object of the present invention to provide a machine for holding a substrate substantially flat while plastic is cast and cured thereon; to provide such a machine in which the temperature of the substrate may be controlled; to provide such a machine in which a radiation source is movable into and out of an operating position adjacent said substrate; and to provide such a machine in which volatile fumes are effectively exhausted.

BRIEF DESCRIPTION OF THE DRAWINGS

FIG.4 is a plan view of the platen of the present invention with portions broken away to reveal the interior structure;

FIG. 5 is a view showing the bottom of the platen with portions broken away to revel the interior structure;

FIG. 6 is a sectional view taken generally along line 6—6 in FIG. 4;

FIG. 7 is a sectional view taken generally along line 7—7 in FIG. 4;

FIG. 8 is a sectional view taken generally along line 8—8 in FIG. 4; and

FIGS. 9A and 9B, when assembled, depict the circuit which controls the operation of the present invention.

DETAILED DESCRIPTION OF THE INVENTION

Figure 1:
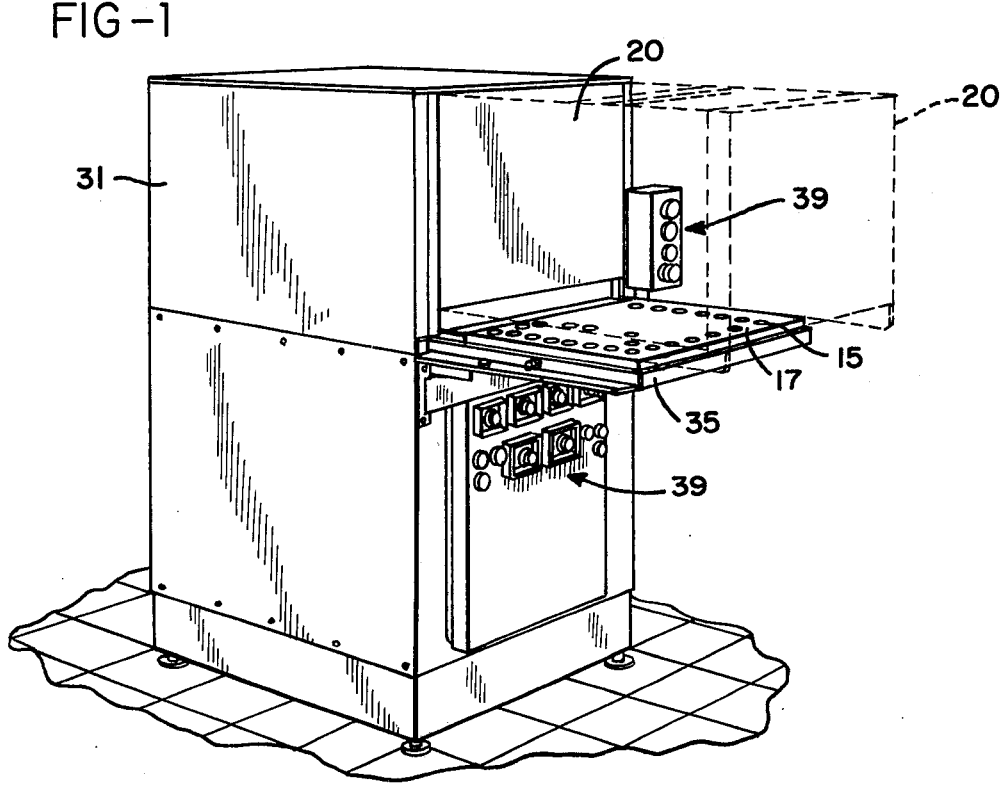
FIG. 1 is a perspective view of the present invention, illustrating the manner in which a portion of the device may be moved.

The present invention relates to a device for use in the casting and curing of plastic on pieces of substrate material. As seen in FIG. 1, a number of pieces of substrate material 15 will typically be provided on a release sheet 17. The substrate material may typically be provided on a release sheet 17. The substrate material may be a metralized Mylar polyester film which has been printed and embossed and has an adhesive backing. The release sheet will typically be a paper material having a low adherence surface such as wax or silicone treated ones from which the pieces of substrate material may be easily removed.

A simple casting operation consists of an operator applying measured portions of a plastic material, such as a liquid polyurethane, to the upper surface of each of the substrates 15. Preferred are polyurethane resins to which a catalyst is added just prior to casting to initiate a curing reaction. In order to drive off rapidly whatever volatile liquids which are present in the liquid polyurethane and promote the curing, an infrared radiation source means for supplying infrared radiation may be provided to irradiate the polyurethane. Such a source is included in member 20 which is shown extended in FIG. 1 in dashed lines.

It is thought preferable to move the source of radiation rather than to move the release sheet and substrates, since movement of the latter could result in the cast liquid polyurethane flowing onto the release sheet 17. The extended position of the member 20 is shown also in FIG. 2, along with lamps 23 which provide the infrared radiation. Member 20 is moved by means of air cylinder 25. It should be understood that an ultraviolet curable plastic may also be cast using the device of the present invention; in such a case, lamps 23 would be ultraviolet radiation sources.

Figure 3:
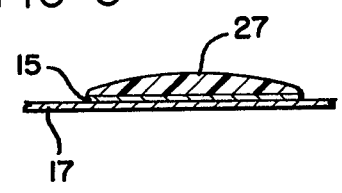
FIG. 3 is a sectional view of an emblem made by the device of the present invention and including a portion of the release sheet upon which the emblem is mounted.

FIG. 3 is a sectional view of an emblem produced by the device of the present invention, showing how the plastic 27 tends to form in the shape of a lense on the substrate 15. The curvature in plastic 27 is a result of the surface tension of the polyurethane liquid. It is important that the substrate 15 and release sheet 17 be held substantially flat during the entire casting and curing process. If this is not done, the cast plastic 27 may flow over the edge of emblem 15 and onto the release sheet, or the emblem may be distorted in shape. In either case, the emblem is not usable and must be discarded.

Figure 2:
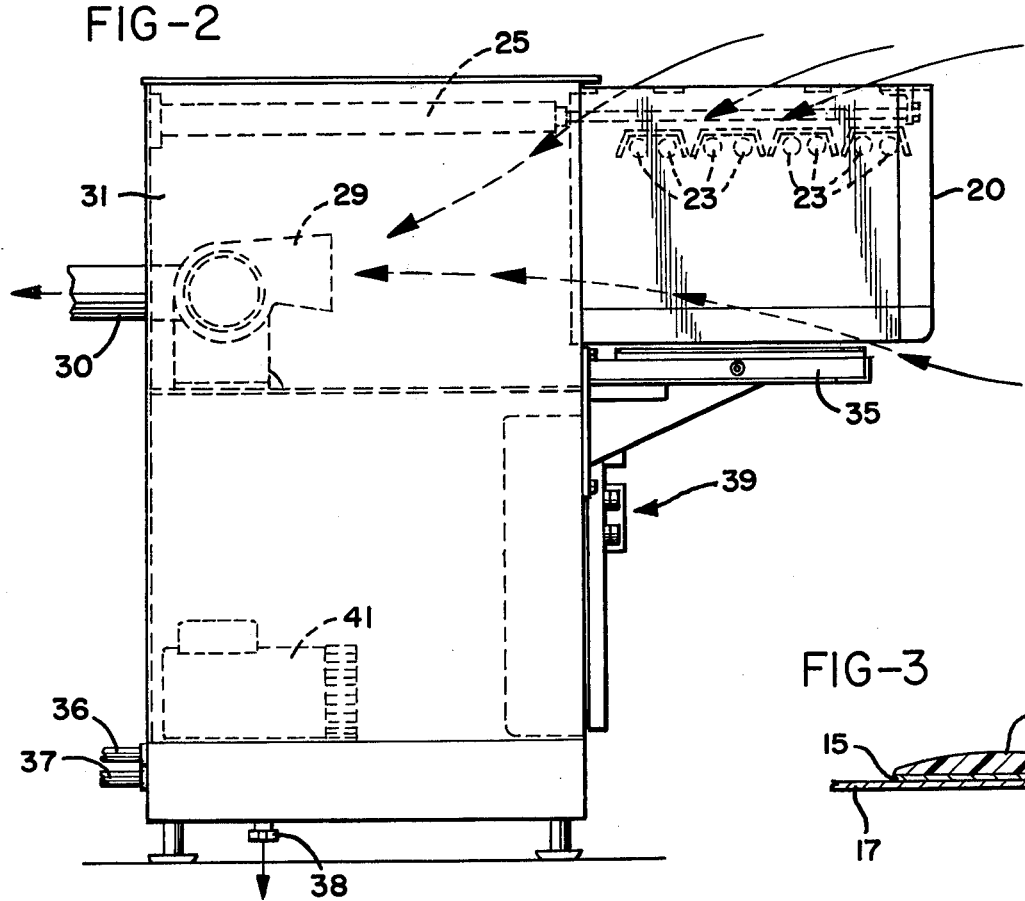
FIG. 2 is a side view of the device.

While only very small amounts of volatiles will be given off by the plastic during curing, an exhaust means including blower 29, exhaust duct 30, and associated motor (not shown) are provided in order to insure that the operator of the machine does not inhale fumes unnecessarily. As illustrated in FIG. 2, ambient air is drawn into the cabinet 31 by fan 29. The air will be drawn over the top of the platen means 35 which holds the release sheet bearing the cast emblems. The air will also be drawn past the lamps 23 preventing fumes from escaping upwardly through member 20 and also cooling lamps 23.

It may be desirable to control the temperature of the substrates prior to and during the casting and curing process. Under some circumstances it may be desirable to maintain the substrates at one temperature during casting and a portion of the curing process, and then to maintain the substrates at a second temperature. Toward this end, water inlets 36 and 37 and one or more outlets 38, are provided to receive and discharge water supplied at more than one temperature.

It may also be desirable to irradiate the substrates prior to the casting process, such that the substrates are heated and the viscosity of the cast plastic reduced as it flows onto the substrates. This reduction in viscosity will cause the plastic to flow more evenly over a larger foil substrate. Since it is desirable to be able to change readily the sequence of steps and the order of these steps, a number of timers and controls shown generally at 39 are provided. Vacuum pump 41 is also provided to supply a vacuum platen 35 with a vacuum for holding the release sheet 17, as described below.

The construction of platen means 35 is shown in greater detail in FIGS. 4-8. FIG. 4 is a plan view of the platen with portions of the upper plate broken away of reveal internal structure. Central member 45 and upper plate 47 define a first cavity 49 which is adjacent the upper surface of the platen 35. Opening 51 communicates between first cavity 49 and vacuum pump 41 via appropriate vacuum tubing (not shown). As seen in FIG. 7, opening 51 may be threaded to receive a fitting for such tubing. A plurality of openings or suction ports 55 are provided in plate 47 and communicate with cavity 49. When vacuum pump 41 is running, air will be drawn continuously through openings 55. When a sheet of release paper bearing substrates is placed on the upper surface of the platen, the suction through openings 55. When a sheet of release paper bearing substrates is placed on the upper surface of the platen, the suction through openings 55 will hold the release paper and the substrates securely in a substantially flat position during the subsequent casting and curing steps.

As seen in FIG. 5, a second cavity 57 is defined by member 45 and bottom plate 60. An inlet means 62 and an outlet means 64 are provided for supplying temperature stabilizing fluid to the second cavity 57. Water will e applied to inlet and outlet means 62 and 64 from water inlets 36 and 37 (FIG. 2.) by appropriate solenoid controlled valves, to be described below. As seen in FIG. 5, ridges 66 define a surpentine path through which the water flows. Thermal conductive means comprising ridges 68 extend upwardly through first cavity 49 and are provided for thermal conduction between the upper surface of the platen 35 and the second cavity 57. Gaps 70 in ridges 68 are provided in order to maintain a partial vacuum throughout cavity 49.

Referring now to FIGS. 9A and 9B, a schematic representation of the control circuit of the present invention is shown when these two FIGURES are assembled with FIG. 9A above 9B. An indication is provided beneath each timer controlled set of contacts as to its condition when the timer is reset, when the timer is timing, and when the timer is timed out but prior to reset. An "X" indicates closed contacts and an "O" indicates open contacts.

The following is illustrative of the manner in which the control circuit operates with the Heat Control switch 75 and Heat Delay switch 80 in their OFF positions. Power is applied to input terminals 85 and, as a result, to transformer 90 via fuses 91. The machine is turned on by momentarily closing the POWER ON switch 93. Relay R1 is thereby energized, and contacts R1a lock in relay R1.

Assuming that a pre-heat operation is desired, switch 95 will be momentarily closed, energizing relay R2. Contacts R2a will then be closed, causing timer T1 to begin timing the pre-heat process. Contacts T1b will close and, as indicated will be closed for the duration of the timing procedure. Contacts R2c will close and electromechanical actuator HC1 will be energized via R3a. Solenoid HC1 will close contacts HC1a, HC1b, and HC1c and lamps 23 will be energized. Although only three lamps 23 are shown in FIG. 9A, it is clear that a substantial number of additional lamps may be connected in parallel with these three. Actuator AV1 will also be energized by relay contacts R2b. Actuator AV1, when energized, causes air to be supplied to cylinder 25 and the lamps to be moved into position above the platen. The preheating operation will then take place for the time determined by timer T1. At the end of this time period, contacts T1a will open, deenergizing relay R2 and, thus causing the lamps and the air cylinder AV1 to be deenergized.

The cure operation is initiated by closing switch 100. Switch 100 energizes relay R8 through contacts T6a. Contacts R8a lock in relay R8. Contacts R8b are then closed and cure timer T4 begins its timing cycle. Contacts T4b and T4c close, thus energizng relay coil R9. Contacts R9a and R9b will then close, causing the solenoid valve AV1 to extend the lamps 23 over the platen and solenoid HC1 to close contacts HC1a, HC1b, and HC1c. At the end of the cure timing cycle, timer T4 will time out, and deenergize relay R9. This will in turn open the contacts which energize the air valve AV1, and the solenoid HC1, and thus causing the lamps to be extinguished and retracted.

When the Water Control switch 110 is in the automatic position, the application of hot and cold water to the platen is controlled by timers T5 and T6 and air valves AV2 and AV3. At the time the cure switch 100 is pressed, and relay R8 energized, relay contacts R8c close, starting the timing cycle of timer T5. Contacts T5b and T5c apply power to air valve AV2 via contacts R11a only during the timing cycle. Air valve AV2 controls application of hot water to the platen. At the end of the timing cycle of timer T5, contacts T5d energize timer T6. Additionally contacts T6c close energizing both the air valve AV3, which controls the application of cold water to the platen, and the coil of R11. Contact R11a then opens preventing further application of hot water to the platen. Since contacts T5c have opened, coil R10 is deenergized and contacts R10a are closed. Timer T6 will then time through its timing cycle. At the end of the cycle, the timer will be disengaged and the application of cold water to the platen will cease.

Under the control of switches 75 and 80, timers T2 and T3 permit irradiation by the lamps 23 in periodic or duty cycle manner. Timer T2 controls the length of time which the lamps are on, while timer T3 controls the intervening periods of time in which the lamps are off. Switches 75 and 80 are switched according to whether it is desired to provide such cyclical irradiation during the curing or pre-heating phases of machine operation, or both.

Switch 75 is a 4-position switch controlling application of power to relay coils R3 and R4. When the duty cycle form of operation is desired for the pre-heat cycle, switch 75 switched into its second position in which contact 75a is closed and contact 75b is open. Heat delay switch 80 is switched OFF so that 80a are closed and 80b are open. In this mode of operation timers T2 and T3 will alternate timing cycles with timer T2 initially timing and controlling the amount of time that HC1 is energized and timer T3 controlling the length of alternate periods during which HC1 is not energized.

If the heat delay switch 80 is switched OFF and the heat control selector switch 75 is switched to its third position, contacts 75a and 75b will both be closed and duty cycle operation will occur during both the pre-heat and cure cycles. In this mode as well, the timer T2 will begin operation initially with subsequent alternate periods timed by timer T3. If placed in the fourth position, heat control switch 75 will close only contacts 75b, thus causing timers T2 and T3 to time a similar duty cycle sequence only during the curing cycle.

If heat delay switch 80 is switched ON, duty cycle operation will occur for each setting of switch 75, but with the initial period will be timed by timer T3. Thus lamps 23 will not be actuated initially but an initial delay period will be timed by timer T3.

The application of cold or hot water to the platen may, of course, be controlled manually by means of switch 110. Switch 120 applies power to pump motor solenoid 125 which closes contacts M1a and M1b, thus supplying power to the pump motor driving vacuum pump 41 (FIG. 2). The pump will normally run continuously during the operation of the device. In like manner, switch 130 will permit fan motor 135 to run driving fan 29 continuously. Switch 140 energizes solenoid V1 which controls application of vacuum to the platen from pump 41.

What is claimed is:

1. A machine for holding a release sheet on which is mounted a plurality of pieces of substrate material while plastic is cast on said pieces of substrate material and for thereafter curing said plastic, comprising:

platen means for holding the release sheet while plastic is cast and cured on the pieces of substrate material mounted thereon, said platen means defining a first cavity and a second cavity and having a plurality of openings communicating between said first cavity and the flat upper surface of said platen, means for maintaining a partial vacuum in said first cavity, whereby air is sucked through said openings such that the release sheet is held flat on said upper surface of said platen means, means for supplying temperature controlled liquid to said second cavity in said platen, whereby the temperature of said upper surface may be controlled, radiation source means for providing radiation, and means for moving said radiation source means into a position above said upper surface of said platen means for irradiation of said plastic, and for retracting said radiation source means after the plastic is irradiated.

2. The machine of claim 1 in which said means for supplying temperature controlled liquid includes means for supplying successively more than one temperature of liquid to said second cavity in said platen means.

3. The machine of claim 1 further comprising means for moving said radiation source means into a position above said upper surface of said platen means prior to casting of said plastic material for irradiating said pieces of substrate material such that said substrate material is heated, thus reducing the viscosity of said plastic material as it is cast on said pieces of substrate material.

4. The machine of claim 1 in which said radiation source means includes duty cycle means fo providing irradiation of the plastic periodically for predetermind periods of time and for not providing irradiation of the plastic during alternated predetermined periods of time.

5. The machine of claim 4 in which said duty cycle means is settable to begin with a predetermined period of time during which the plastic is irradiated or to begin with a predetermined period of time during which the plastic is not irradiated.

6. The machine of claim 1 in which said radiation source means is a source of infrared radiation.

7. The machine of claim 1 in which said radiation source means is a source of ultraviolet radiation.

8. A machine for holding a release sheet on which is mounted an emblem substrate and for curing plastic cast on said substrate comprising:
   platen means for holding the release sheet substantially flat during casting and curing of the plastic and for controlling the temperature of the release sheet and substrate,
   radiation source means for providing radiation,
   means for moving said radiation source means into a position above said platen means such that plastic cast on said substrate may be cured, and
   exhaust means for drawing air across said platen and past said radiation source means, and for removing said air via an exhaust duct.

9. The machine of claim 8 in which said radiation source means is a source of infrared radiation.

10. The machine of claim 9 in which said platen means holds the release sheet positively by means of suction ports in the upper surface of said platen means.

11. The machine of claim 9 in which said radiation source means includes means for irradiating the cast plastic only periodically during the process.

12. A machine for holding a substrate substantially flat while plastic is cast and cured on the substrate, and for irradiating the plastic to aid the curing process, comprising:
    a source of radiation, and
    platen means for holding the substrate, comprising:
        means defining a first cavity , adjacent the upper surface of said platen means,
        means for evacuating said first cavity,
        means defining openings between said upper surface and said first cavity,
        means defining a second cavity beneath said first cavity,
        inlet and outlet means for supplying temperature stabilizing fluid to said second cavity, and
        thermal conductive means extending upwardly through said first cavity for thermal conduction between said upper surface of said platen and said second cavity.

* * * * *

UNITED STATES PATENT AND TRADEMARK OFFICE
CERTIFICATE OF CORRECTION

PATENT NO. : 4,034,708
DATED : July 12, 1977
INVENTOR(S) : William A. Fielder; Harold E. Wilson; and Robert E. Waugh It is certified that error appears in the above-identified patent and that said Letters Patent are hereby corrected as shown below:

Column 2, line 63, "revel" should be --reveal--.

Column 4, line 43, "e" should be --be--.

Column 7, line 4, "fo" should be --for--. (Claim 4)

Column 8, line 11, after "the" insert --curing--. (Claim 11)

Signed and Sealed this

Fourteenth Day of February 1978

[SEAL]

Attest:

RUTH C. MASON
Attesting Officer

LUTRELLE F. PARKER
Acting Commissioner of Patents and Trademarks